UNITED STATES PATENT OFFICE.

CLEMENT E. GARDINER, OF BIRMINGHAM, ENGLAND, AND ALFRED HODGE, OF NEW YORK, N. Y.

LOZENGE, &c.

SPECIFICATION forming part of Letters Patent No. 241,486, dated May 17, 1881.

Application filed April 19, 1881. (No specimens.)

*To all whom it may concern:*

Be it known that we, CLEMENT E. GARDINER, of Birmingham, England, and ALFRED HODGE, of New York city, in the county and State of New York, have invented a new and useful Improvement in Lozenges and other Articles of Confectionery, which improvement is fully set forth in the following specification.

The invention relates to the manufacture of lozenges and other confections containing gelatine or gelatinous material.

It consists in preparing said lozenges or confections with glycerine or other suitable non-drying material, which will keep them in a soft and pliable condition; and it consists, also, in combining the sugar with the gelatine in the proportion named below.

In order that others skilled in the art to which it appertains may be able to make and use the invention, what is regarded as the best method of making lozenges in accordance therewith will now be explained.

Equal parts, by weight, of sugar and fine gelatine are boiled separately and then mixed together. To this mixture is added one-fourth part of glycerine, together with acid and flavor, according to the requirement of the case. The whole is then boiled again and finally poured out in the form of a sheet, which sheet of composition, when cold, is cut into lozenges.

The amount of water to be employed and the length of time during which the boiling should be continued can readily be regulated by those skilled in the art. For sake of illustration it may be stated that if one hundred pounds each of gelatine and sugar are used twenty-five quarts of water will answer. The first boiling may continue until both of the before-mentioned ingredients are thoroughly melted; the second until all the ingredients are thoroughly mixed and combined.

A lozenge-machine of any ordinary or suitable construction is or may be used to cut out the lozenges. The glycerine has the effect of keeping them soft and pliable for an indefinite period, and also adds to their medicinal value.

It is obvious that glycerine can be used for the purposes indicated in lozenges containing gelatine and sugar and other ingredients in various proportions; but the proportions given are deemed preferable. The invention includes such use of glycerine and its equivalents, and it includes also the substitution, in whole or in part, for the sugar, of molasses, grape-sugar, glucose, maltose, honey, or other saccharine material.

We claim—

1. A lozenge or other confection containing glycerine in connection with gelatine, substantially as described.

2. In a lozenge or other confection, the combination of gelatine and sugar in substantially equal proportions, as set forth.

In testimony whereof we have signed this specification in the presence of two subscribing witnesses.

C. E. GARDINER. [L. S.]
   ALFRED HODGE. [L. S.]

Witnesses:
 THOS. B. CLIFFORD,
 GEORGE W. PAGE.